United States Patent  (10) Patent No.: US 11,302,027 B2
Keen et al.                     (45) Date of Patent:        Apr. 12, 2022

(54) METHODS AND SYSTEMS FOR MANAGING VIRTUAL REALITY SESSIONS (71) Applicant: INTERNATIONAL BUSINESS MACHINES CORPORATION, Armonk, NY (US)

(72) Inventors: Martin G. Keen, Cary, NC (US); Richard D. Johnson, Raleigh, NC (US); Adam Smye-Rumsby, Reading, PA (US); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/743,776

(22) Filed: Jan. 15, 2020

(65) Prior Publication Data
US 2020/0202552 A1   Jun. 25, 2020

Related U.S. Application Data (63) Continuation of application No. 16/019,360, filed on Jun. 26, 2018, now Pat. No. 10,607,367.

(51) Int. Cl.
A63F 13/215 (2014.01)
A63F 13/216 (2014.01)
(Continued)

(52) U.S. Cl.
CPC .............. G06T 7/70 (2017.01); A63F 13/215 (2014.09); A63F 13/216 (2014.09);
(Continued)

(58) Field of Classification Search
CPC .......... G02B 27/017; G02B 2027/0178; G06F 1/163; G06F 2203/04804; G06F 3/011;
(Continued)

(56) References Cited

U.S. PATENT DOCUMENTS 7,143,031 B1 * 11/2006 Ahroon .................. A61B 5/121
                                                        704/224
9,754,167 B1 *  9/2017 Holz ...................... G06T 19/006
(Continued)

FOREIGN PATENT DOCUMENTS

EP          3133468 A1     2/2017

OTHER PUBLICATIONS

Anonymous, "Method to alter content of virtual reality based on real world obstacles," An IP.com Prior Art Database Technical Disclosure, IPCOM000252984D, Feb. 27, 2018 (2 pages).
(Continued)

Primary Examiner — Jin Cheng Wang
(74) Attorney, Agent, or Firm — Griffiths & Seaton PLLC (57) ABSTRACT Embodiments for managing virtual reality (VR) sessions by one or more processors are described. A condition associated with a user experiencing a VR session is detected. A severity of the condition is determined. The determining of the severity of the condition is performed using a cognitive analysis of a detected situation associated with the condition that will affect the user, notwithstanding whether the detected situation is currently occurring within a vicinity of the user experiencing the VR session. If the severity is above a predetermined threshold, a signal representative thereof is generated.

15 Claims, 6 Drawing Sheets (51) Int. Cl.

| | |
|---|---|
| *G02B 27/01* | (2006.01) |
| *G06T 19/00* | (2011.01) |
| *G06T 7/70* | (2017.01) |
| *G06F 3/01* | (2006.01) |
| *G06F 3/0481* | (2022.01) |
| *G06K 9/00* | (2022.01) |
| *G06F 3/04815* | (2022.01) |
| *G06V 20/20* | (2022.01) |
| *G06V 20/58* | (2022.01) |

(52) U.S. Cl.
CPC .......... *G02B 27/017* (2013.01); *G06F 3/011* (2013.01); *G06F 3/012* (2013.01); *G06F 3/04815* (2013.01); *G06T 19/006* (2013.01); *G06V 20/20* (2022.01); *G06V 20/58* (2022.01); *A63F 2300/8082* (2013.01); *G02B 2027/0178* (2013.01)

(58) Field of Classification Search
CPC .......... G06F 3/012; G06F 3/016; G06F 3/017; G06F 3/0304; G06F 3/04815; G06F 3/167; G06T 19/006; G06T 2215/16; G06K 9/00805; G06K 9/00671; G08B 21/02
USPC ...................................... 345/633, 8
See application file for complete search history.

(56) References Cited

U.S. PATENT DOCUMENTS

| | | | |
|---|---|---|---|
| 9,939,635 | B2 | 4/2018 | Thomas et al. |
| 10,380,875 | B1* | 8/2019 | Roberts ................. G08B 13/08 |
| 2012/0232966 | A1 | 9/2012 | Calman et al. |
| 2013/0328928 | A1 | 12/2013 | Yamagishi et al. |
| 2014/0168266 | A1 | 6/2014 | Kimura |
| 2015/0094142 | A1* | 4/2015 | Stafford ................. A63F 13/211 463/31 |
| 2016/0042567 | A1* | 2/2016 | Shuster ................. G06T 19/20 345/633 |
| 2016/0078278 | A1 | 3/2016 | Moore et al. |
| 2016/0124502 | A1 | 5/2016 | Sawyer et al. |
| 2016/0267759 | A1* | 9/2016 | Kerzner ............ G08B 13/19684 |
| 2016/0342840 | A1 | 11/2016 | Mullins et al. |
| 2017/0053440 | A1 | 2/2017 | Yoon et al. |
| 2017/0104875 | A1* | 4/2017 | Im ........................ H04M 3/5191 |
| 2017/0220863 | A1 | 8/2017 | Lection et al. |
| 2017/0248785 | A1* | 8/2017 | Thomas ................... G08B 5/22 |
| 2017/0323161 | A1 | 11/2017 | Du et al. |
| 2017/0345194 | A1 | 11/2017 | Park et al. |
| 2017/0351485 | A1* | 12/2017 | Kohler ..................... A63F 13/25 |
| 2017/0372499 | A1* | 12/2017 | Lalonde ............... G02B 27/017 |
| 2018/0025743 | A1* | 1/2018 | Childress ................ G10L 25/63 704/205 |
| 2018/0095542 | A1 | 4/2018 | Mallinson |
| 2018/0176168 | A1* | 6/2018 | Tsou ........................ H04L 51/08 |
| 2018/0190027 | A1* | 7/2018 | Yao .......................... G06F 3/011 |
| 2018/0232056 | A1* | 8/2018 | Nigam ..................... G06F 3/013 |
| 2018/0261067 | A1* | 9/2018 | Bostick ............. G08B 21/0476 |
| 2018/0276891 | A1* | 9/2018 | Craner ..................... G06T 19/20 |
| 2018/0276969 | A1* | 9/2018 | Obaidi ...................... G08G 9/02 |
| 2018/0357865 | A1* | 12/2018 | Saidi ........................ G08B 7/066 |
| 2019/0041651 | A1* | 2/2019 | Kiemele ................... G06F 3/011 |
| 2019/0050774 | A1* | 2/2019 | Divine ..................... G16H 50/20 |
| 2019/0164343 | A1* | 5/2019 | Bailey ..................... A63F 13/75 |
| 2019/0320138 | A1* | 10/2019 | Kaufthal .............. G02B 27/017 |
| 2019/0362612 | A1* | 11/2019 | Myers ................. G08B 27/005 |
| 2020/0034995 | A1* | 1/2020 | Joshi ........................ H04W 4/20 |
| 2020/0082842 | A1* | 3/2020 | Brown ..................... G06F 3/012 |

OTHER PUBLICATIONS

Polap et al., "Obstacle Detection as a Safety Alert in Augmented Reality Models by the Use of Deep Learning Techniques," Sensors, 2017 (16 pages).

* cited by examiner

METHODS AND SYSTEMS FOR MANAGING VIRTUAL REALITY SESSIONS

CROSS REFERENCE TO RELATED APPLICATIONS

This Application is a Continuation of U.S. patent application Ser. No. 16/019,360, filed on Jun. 26, 2018.

BACKGROUND OF THE INVENTION

Field of the Invention

The present invention relates in general to computing systems, and more particularly, to various embodiments for managing virtual reality (VR) sessions.

Description of the Related Art

"Virtual reality" (VR) typically refers to computer-generated sessions or scenarios that simulate an experience, similar to the real world or fantasy, which is often not possible, at least for some users, in physical reality. VR has gained popularity in recent years, as millions of VR systems are now sold annually.

While immersed in VR sessions, users are often not aware of various real world conditions (e.g., visible and/or audible) occurring in their vicinity (e.g., the room/area being used for the VR session). For example, the user may not be aware of an object or person that is behind them or may not be able to hear sounds, such as fire alarms and the ringing of phones. This may particularly be an issue with VR systems that include a VR visor, which covers the user's eyes, and a headset or headphones.

SUMMARY OF THE INVENTION

Various embodiments for managing virtual reality (VR) sessions by one or more processors are described. In one embodiment, by way of example only, a method for managing VR sessions, again by one or more processors, is provided. A condition associated with a user experiencing a VR session is detected. A severity of the condition is determined. The determining of the severity of the condition is performed using a cognitive analysis of a detected situation associated with the condition that will affect the user, notwithstanding whether the detected situation is currently occurring within a vicinity of the user experiencing the VR session. If the severity is above a predetermined threshold, a signal representative thereof is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, "virtual reality" (VR) typically refers to computer-generated sessions or scenarios that simulate an experience, similar to the real world or fantasy, which is often not possible, at least for some users, in physical reality. VR has gained popularity in recent years, as millions of VR systems are now sold annually.

While immersed in VR sessions, users are often not aware of various real world conditions (e.g., visible and/or audible) occurring in their vicinity (e.g., the room/area being used for the VR session). This may particularly be an issue with VR systems that include a VR visor, which covers the user's eyes, and a headset or headphones, as the user may be completely oblivious of a real world condition going on around them.

For example, while in a VR session, the user may not be aware of an object (e.g., a ball or pet on the floor) or person (e.g., a child) that is on the floor behind them. If the user walks backwards, which may be appropriate given the events in the VR session, an injury may occur or an individual may not receive needed attention or care. As another example, the user may not be able to hear important sounds, such as the ringing of phones, fire/smoke detectors, etc.

To address these needs, some embodiments described herein provide methods and systems for managing VR sessions, which include, for example, monitoring the vicinity in which the VR session is taking place for visual and audible conditions, classifying the conditions, and determining whether or not the VR session should be interrupted (or modified) because of the conditions. In some embodiments, a "cognitive analysis" is utilized to, for example, classify the conditions and/or determine whether or not the VR session should be interrupted.

That is, in some embodiments, the methods and systems described herein classify visual and audio conditions or elements surrounding a VR user to derive if their presence warrants interrupting the VR session to notify the user of these conditions. In addition, the methods and systems may analyze input from external electronic devices. The decision to alert a user in a VR session may be based on an analysis of predefined preferences, user specific preferences, and/or crowdsourced preferences. The methods and systems may consider the level of interruption to apply to a VR session based on the "severity" of the visual or audio conditions. Some conditions may result in disabling the entire VR system, while others may incorporate a visual or audio condition into the VR environment. The methods and systems may receive user feedback to improve performance of interruptions to VR sessions over time to improve user specific preference adoption and severity ratings.

For example, in some embodiments, the methods and systems described herein utilize a camera and a microphone, such as those integrated with a VR system, to capture streaming video and audio of a user's surroundings (or vicinity) when they are in a VR session. A cognitive system analyzes the streaming video and audio to classify the condition(s), such as people, objects, sounds, words, etc., captured in the streams. Additionally, external electronic devices (e.g., "smart" devices, "Internet of Things" (IoT) devices, etc.) may provide input to the cognitive system. A cognitive system (e.g., the same cognitive system) applies an analytics engine to derive if the VR session should be interrupted based on, for example, the content of the video and audio stream and the relationship thereof to the user. If deemed necessary, the VR session is interrupted by, for example, disabling the VR system (or ceasing the VR session) or incorporating a rendering of the condition(s) into the VR session (or environment).

The cognitive analysis may utilize a visual recognition service and an audio recognition service, as is commonly understood in the art. With respect to audio, the cognitive analysis may include classifying natural language, analyzing tone, and analyzing sentiment (e.g., scanning for keywords, key phrases, etc.) with respect to, for example, detected words. Over time, the methods and systems described herein may determine correlations (or insights) that allow for an improvement in the interrupting of VR sessions, perhaps with feedback provided by users, that allows for the performance of the system to improve with continued use.

As such, in some embodiments, the methods and/or systems described herein may utilize a "cognitive system," "cognitive analysis," "cognitive modeling," "machine learning," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the interruption of VR sessions based on the detection of conditions in the vicinity of the user. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for managing virtual reality (VR) sessions is provided. A condition in a vicinity of a user experiencing a VR session is detected. A severity of the condition is determined. The determining of the severity of the condition is performed using a cognitive analysis. If the severity is above a predetermined threshold, a signal representative thereof is generated.

The VR session may be caused to be interrupted based on the signal. The causing of the VR session to be interrupted may include ceasing the VR session.

The experiencing of the VR session by the user may be performed utilizing a VR system. The detecting of the condition may include detecting an object in the vicinity with a camera integrated with the VR system. The causing of the VR session to be interrupted may include incorporating a visual rendering of the object into the VR session.

The experiencing of the VR session by the user may be performed utilizing a VR system. The detecting of the condition may include detecting a sound in the vicinity with a microphone integrated with the VR system. The causing of the VR session to be interrupted may include incorporating an aural (or audible) rendering of the sound into the VR session.

The experiencing of the VR session by the user may be performed utilizing a VR system. The detecting of the condition may be performed utilizing an electronic device external to the VR system.

The determining of the severity of the condition may include identifying the condition based on the detecting of the condition. The identifying of the condition may be performed utilizing at least one of a visual recognition service and an audio recognition service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
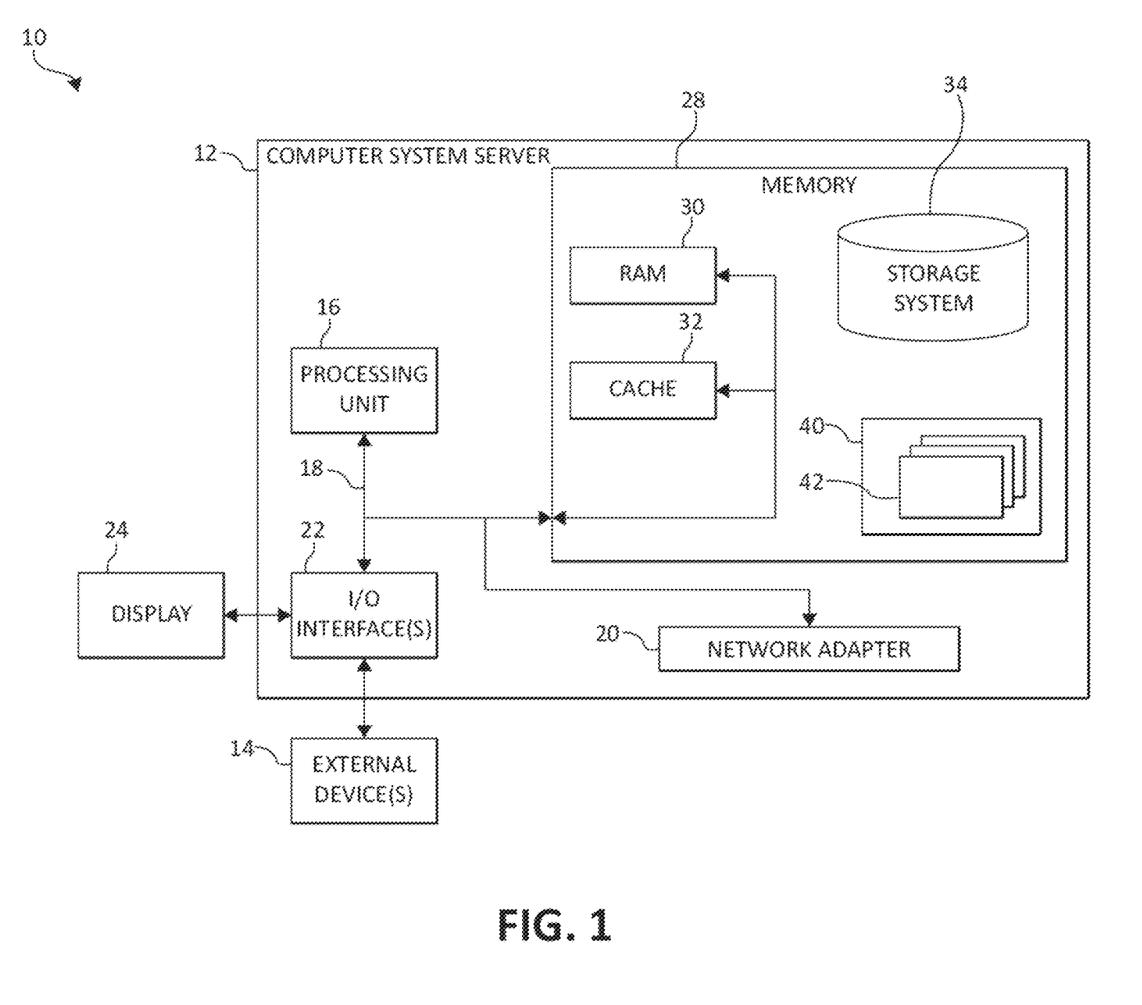
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, VR systems (or devices), personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
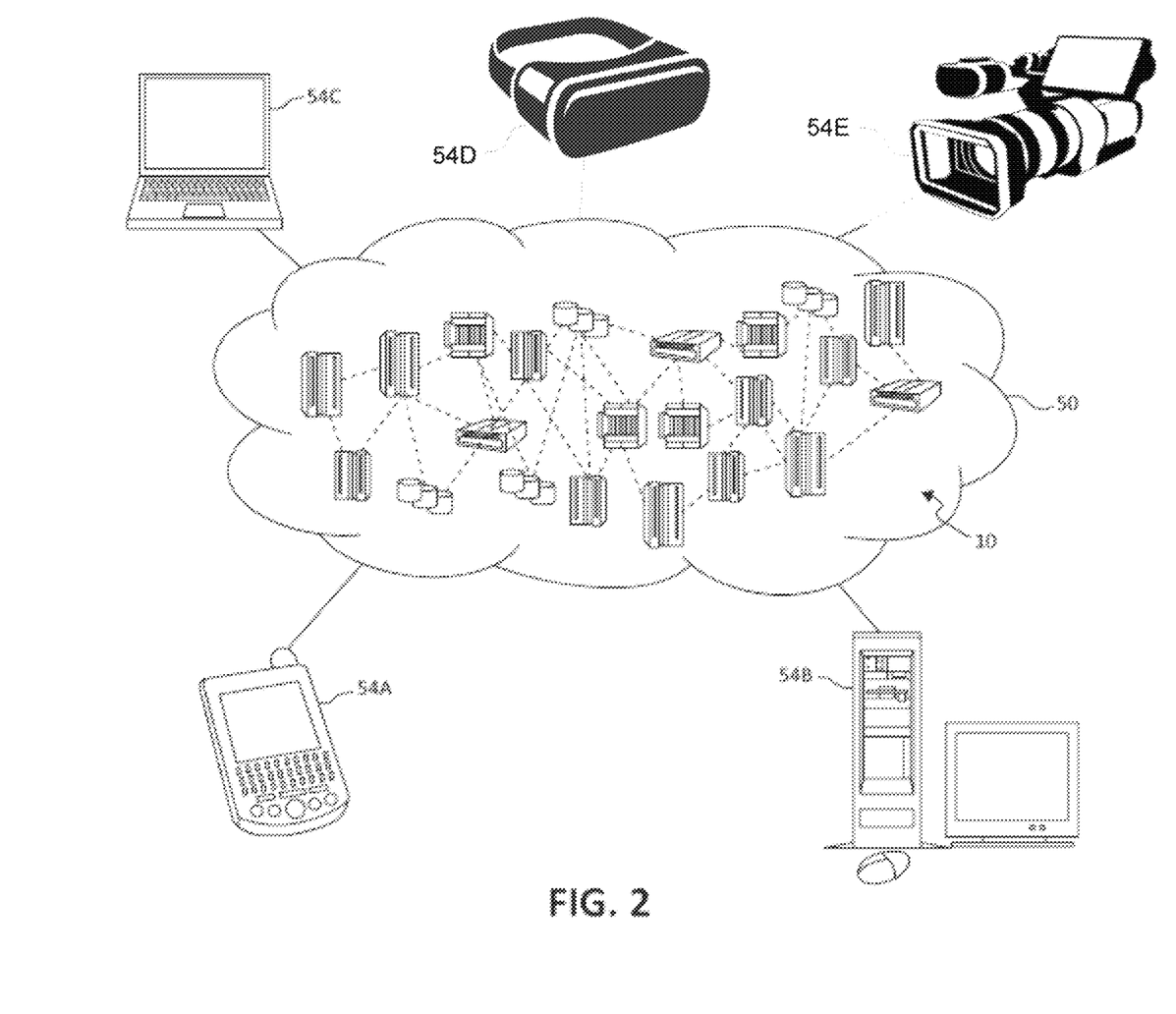
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, VR system 54D, and other electronic devices (e.g., IoT devices, sensors, cameras, etc.) 54E may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
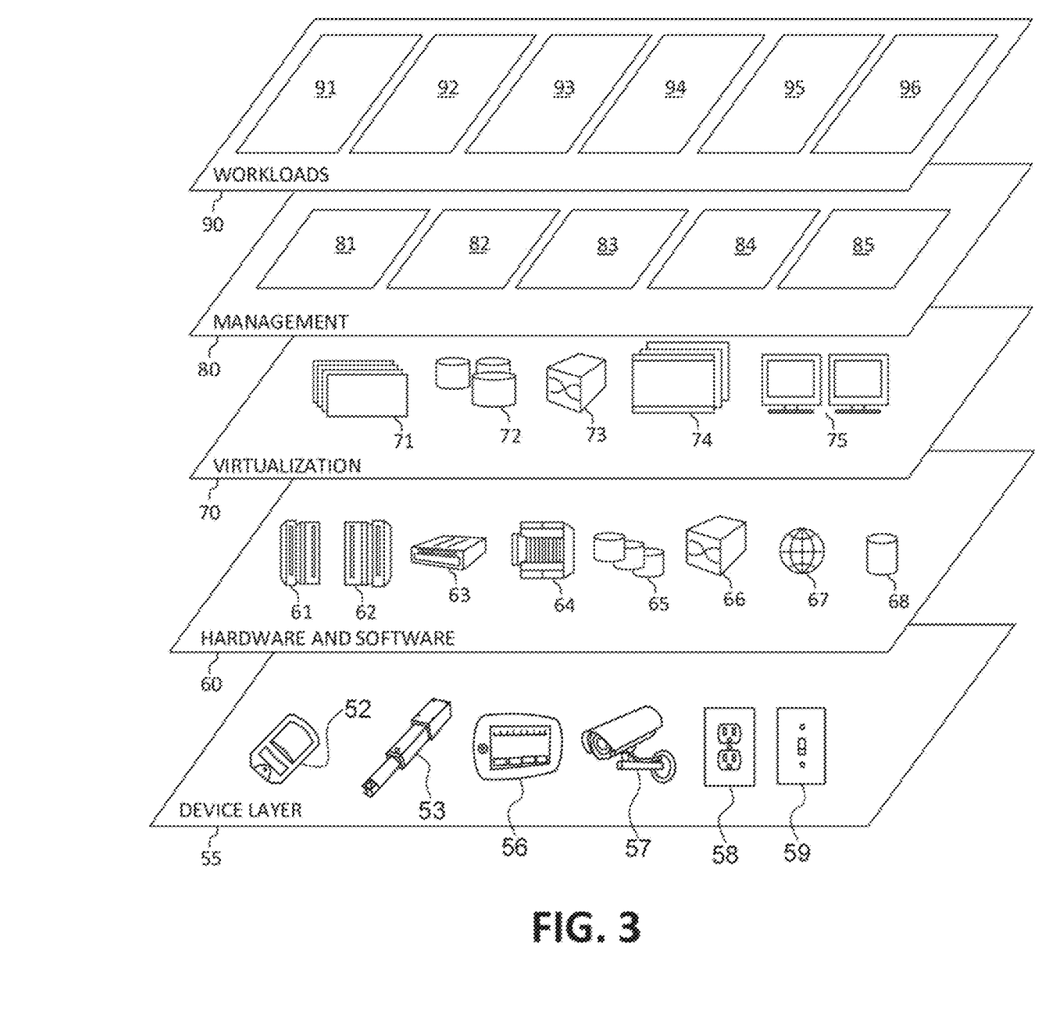
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, VR systems/devices, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing VR sessions as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, the methods and systems described herein classify visual and audio conditions or elements surrounding a VR user to derive if their presence warrants interrupting the VR session to notify the user of these conditions. In addition, the methods and systems may analyze input from external electronic devices. The decision to alert a user in a VR session may be based on an analysis of predefined preferences, user specific preferences, and/or crowd sourced preferences. The methods and systems may consider the level of interruption to apply to a VR session based on the "severity" of the visual or audio conditions. Some conditions may result in disabling the entire VR system, while others may incorporate a visual or audio condition into the VR environment. The methods and systems may receive user feedback to improve performance of interruptions to VR sessions over time to improve user specific preference adoption and severity ratings.

In some embodiments, the methods and systems described herein utilize a camera and a microphone, such as those integrated with a VR system, to capture streaming video and audio of a user's surroundings (or vicinity) when they are in a VR session. A cognitive system analyzes the streaming video and audio to classify the condition(s), such as people, objects, sounds, words, etc., captured in the streams. Additionally, external electronic devices (e.g., "smart" devices, "Internet of Things" (IoT) devices, etc.) may provide input to the cognitive system. A cognitive system (e.g., the same cognitive system) applies an analytics engine to derive if the VR session should be interrupted based on, for example, the content of the video and audio stream and the relationship thereof to the user. If deemed necessary, the VR session is interrupted by, for example, disabling the VR system (or ceasing the VR session) or incorporating a rendering of the condition(s) into the VR session (or environment).

Figure 4:
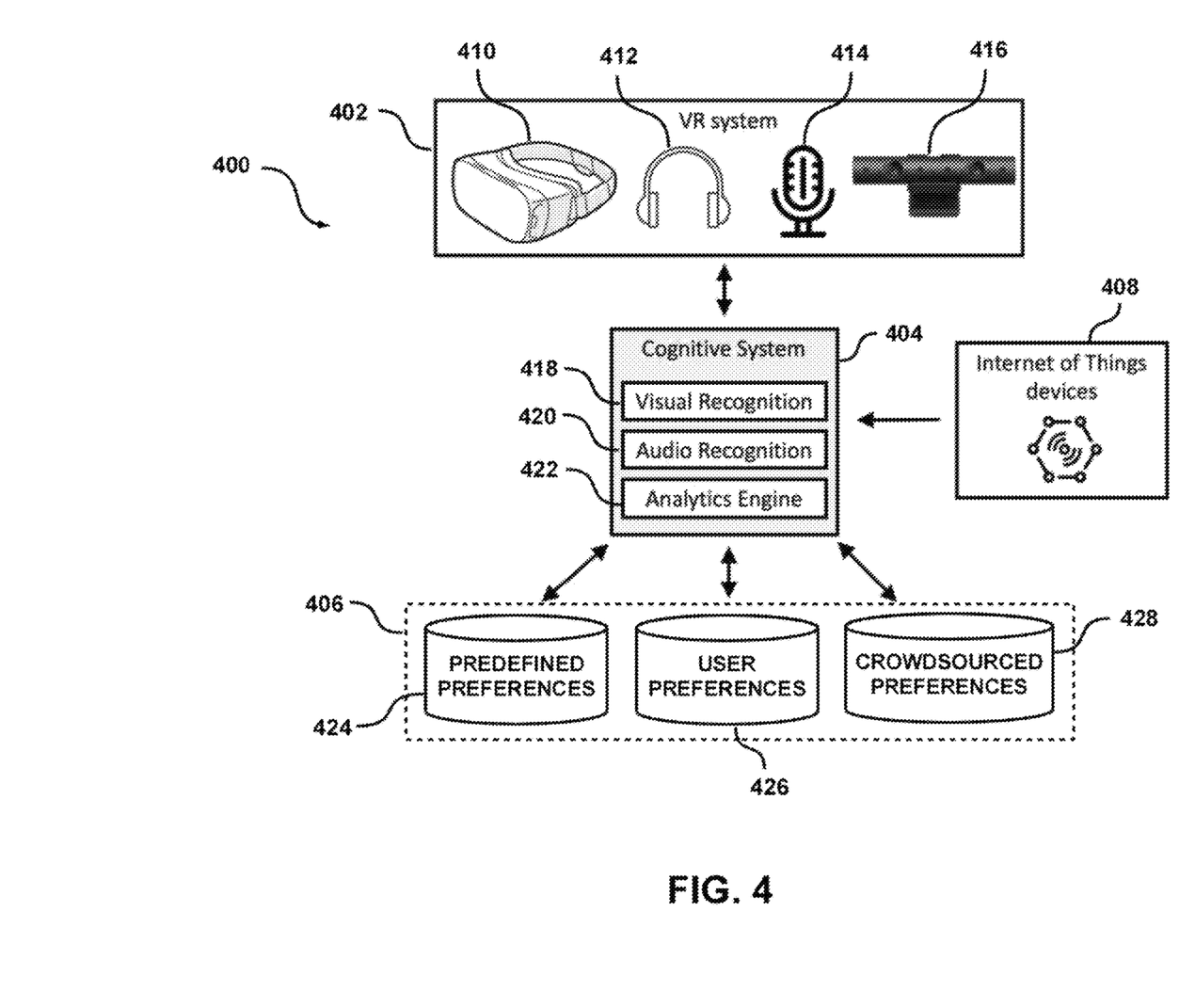
FIG. 4 is a block diagram of a system for managing virtual reality (VR) sessions according to an embodiment of the present invention.

FIG. 4 illustrates a system 400 for managing VR sessions according to some embodiments described herein. The system 400 includes (or utilizes) a VR system (or sub-system or device) 402, a cognitive system 404, and preferences 406. In the depicted embodiment, the system also includes (or utilizes) one or more Internet of Things (IoT) devices 408, as described in greater detail below.

In the example shown, the VR system 402 includes a VR visor 410, headphones (or earphones) 412, a microphone 414, and a camera 416. As will be appreciated by one skilled in the art, the VR visor 410 may be configured to be worn by a user (or individual) such that a display device integrated therein (or coupled thereto) is positioned directly in front of the eyes of the user. For example, the VR visor 410 may include a band or strap that wraps around the head of the user so that the display device is suspended in a proximity of the user's eyes such that images rendered by the display device dominate the view of the user. During operation of the VR system 402, the VR visor 410 (and/or the display device thereof) may be utilized to, for example, render or display the visual aspects of a VR environment created by the VR system 402 and/or experienced by the user during a VR session.

The headphones 412 may be similarly configured to be worn by a user such that one or more speakers integrated therein (or coupled thereto) are position in close proximity to the ears of the user. In some embodiments, the headphones 412 may be integrated into the VR visor 410 (e.g., the VR visor 410 may include speakers). During normal operation of the VR system 402, the headphones 412 (and/or the speakers thereof) may be utilized to, for example, render or create the audible (or aural) aspects (e.g., sounds) of a VR environment created by the VR system 402 and/or experienced by the user during a VR session.

The microphone 414 may be (or include) any transducer that is suitably configured to detect sound and/or convert sound (e.g., sound waves) into electrical signals, as is commonly understood. In some embodiments, the microphone 414 may be integrated into the headphones 412 and/or the VR visor 410. During normal operation of the VR system 402, the microphone 414 may be utilized to, for example, enable communications, such as to allow the user to "chat" with other users simultaneously connected to or immersed in the same VR environment (e.g., an online VR session or game).

The camera 416 may be (or include) any electromagnetic sensor (e.g., visible light, infrared, etc.) that is suitably configured to monitor visual aspects (e.g., the position and/or movement of objects) of the user's VR session in the real world. For example, the camera 416 may be used to track movements of the user in the real world, allowing for the user to move in an appropriate manner within the VR environment. In some embodiments, the camera 416 is external to the VR visor 410 and headphones 412 (e.g., the camera is placed in a stationary position on a table in the room or area where the user is using the VR system 402). However, in some embodiments, the camera 416 may be integrated within the VR visor 410 and/or headphones 412 (e.g., to track the movement of the user by detecting changes in the position/distance of objects in the vicinity relative to the camera 416).

The cognitive system 404 may be (or include) any computing device or module suitably configured to perform the cognitive analysis (or analyses) described herein. As such, the cognitive system 404 may be implemented within any suitable computing node (e.g., a computing device and/or software application, local or remote), such as those described above. In some embodiments, the cognitive system 404 includes (or utilizes) a visual recognition service 418, an audio recognition service 420, and an analytics engine (or module) 422, which are configured to perform the functionalities described below.

The preferences 406 may include any options, selections, or "tuning" parameters that may be used to manage (e.g., interrupt) VR sessions as described herein. In the depicted embodiment, the preferences 406 include predefined preferences 424, user preferences 426, and "crowdsourced" preferences 428, as described in greater detail below. The preferences 406 may be stored on any suitable memory, such as one integrated within a local computing device or a remote computing device (e.g., online, in the cloud, etc.).

The IoT devices 408 may include any electronic device that is external to the VR system 402, which may be used to provide input for the managing of VR sessions as described herein. For example, the IoT devices 408 may include one or more "smart" device that is in operable communication with the cognitive system 404, such as smart appliances (e.g., ovens, refrigerators, etc.), mobile electronic devices (e.g., mobile phones, tablets, etc.), and various types of sensors or systems (e.g., smoke detectors, fire alarms, security sensors, news services, cameras and/or microphones external to the VR system 402, etc.). It should be noted that the IoT devices 408 may not be included or utilized in some embodiments.

Still referring to FIG. 4, in some embodiments, operation of the system 400 begins with a user initiating a VR session with the VR system 402, which may include the user wearing the VR visor 410 and the headphones 412. As described above, the VR visor 410 (or a display device thereof) renders visual aspects or elements of the VR session (or the VR environment thereof), while the headphones (or speakers thereof) renders audible aspects or elements. In some embodiments, the microphone 414, the camera 416, and/or the IoT devices 408 are used to monitor the user's surroundings in the real world and/or detect/capture any conditions, or change in conditions, thereof.

In some embodiments, during the VR session, the microphone 414 may be used not only to record or transmit the voice of the user, but to monitor the vicinity in which the user is experiencing the VR session (e.g., the room or building in which the VR system 402 is being used). That is, the system 400 may utilize the microphone 414 of the VR system 402 to record streaming audio of the user's surroundings. A volume threshold may be considered such that the microphone 414 passively records the ambient noise level when the headphones 412 are not in use to be able to provide a baseline for comparison to determine if a particular audio event is out of the ordinary.

Similarly, the camera 416 may be used not only to track or monitor the user's position and/or movements in the real world, but to monitor the vicinity around the user for other conditions, such as the presence of objects, other individuals, pets, etc. That is, the system 400 may utilize the camera 416 of the VR system 402 to record streaming video of the user's surroundings.

Additionally, in some embodiments, the IoT devices 408 may (also) be used to detect conditions in the user's vicinity, such as by capturing or detecting visual, audio, and/or alert-based input. Examples include an oven alerting a user to food being ready, a home surveillance camera capturing video, or a smoke detector reporting an incident. This input data may be extended to external notifications, such as a notification of an earthquake that the user might not otherwise be alerted to or a notification of an upcoming severe weather event, such as an imminent hail storm.

Data from the microphone 414, the camera 416, and/or the IoT devices 408 is sent to (or retrieved by) the cognitive system 404. In some embodiments, the cognitive system 404 utilizes the visual recognition service 418 to, for example, classify and identify objects within the video stream. As will be appreciated by one skilled in the art, the visual recognition service 418 may identify the presence of people, derive their gender and age range, utilize facial recognition to derive their identity, and perhaps determine their emotional state, as well as that of other objects (e.g., pets, furniture, toys, etc.). Similarly, the cognitive system 400 utilizes the audio recognition service 420 to, for example, classify and, in the case of spoken word, transcribe the audio. As will be appreciated by one skilled in the art, the audio recognition service 420 may identify the source of a sound (e.g., a ringing telephone) or utilize a speech-to-text service to transcribe words that are spoken. Additionally, the audio recognition service 420 (and/or the cognitive system 400 as a whole) may be able to perform other analyses on spoken words (or transcriptions thereof) that are detected, such as classifying natural language, analyzing tone, and analyzing sentiment, as is commonly understood. The system may learn from the analyses performed in the prior steps to adapt the text spoken and video seen to present the results of the analysis.

Still referring to FIG. 4, in some embodiments, the cognitive system 404 then utilizes the analytics engine 422 to determine if the VR session should be interrupted. For example, the cognitive system 400 may apply the visual and audio classifications (or identifications) generated by the visual recognition service 418 and the audio recognition service 420, and perhaps input from the IoT device 408, to the preferences 406 to determine if the VR session should be ceased, modified, etc. With respect to the preferences 406, the predefined preferences 424 may include rules or settings defined and customizable to the system. For example, the predefined preferences may include, or determine, what action(s) should be taken by the system 400 if a given situation occurs, such as a phone ringing or a fire alarm sounding.

The user preferences (or user specific preferences) 426 may be related to a user's particular situation or personal preferences. For example, the system 400 may determine the VR session should be interrupted if a child of the user is detected standing by himself/herself in the same room or area being used for the VR session, or if a user's name is spoken. Conversely, VR session interruption may not be warranted if the user's child is playing with friends, or a nearby conversation does not relate to the user. The user preferences 426 may be manually set or inputted into the system 400 by the user.

The crowdsourced preferences 428 may relate to what causes other VR users (e.g., registered in an online organization related to the system 400) to interrupt a VR session. For example, if a significant number of other users have defined a specific preference for interrupting a VR session, the same preference may be applied to the user's session as well. The crowdsourced preferences 428 may be adopted by the user and sourced from the body of other VR system users. The user may set up a user specific preference to rank or score when a crowd source preference should be considered (e.g., utilize only crowdsourced preferences used by at least a particular number or percentage of the other users). Such may facilitate the cognitive system 400 in determining if/when crowdsourced preferences should be considered in the future.

In some embodiments, the cognitive system 404 determines or calculates a grade for each detected condition using the preferences 406, as described above. The grades may be numerical (e.g., scores) and may be based on any suitable scale (e.g., positive or negative integers). However, the grades may also essentially be a categorization of the "severity" of the condition, such as "high priority" or "high relevance," "low priority" or "low relevance," etc. If the cognitive system 400 determines that the VR session should be interrupted (e.g., the grade or severity is above or below a predetermined threshold), the VR session is interrupted as described below. If not, the cognitive system 404 (or the system 400) continually analyzes the video and audio streams, and perhaps input from the IoT devices 408, for the duration of the VR session.

If the cognitive system 404 determines that the VR session should be interrupted, the cognitive system 404 generates an appropriate signal which is sent to the VR system 402 to initiate the interruption. The cognitive system 404 may also specify the type of interruption based on the severity of the cause of the interruption (e.g., based on the detected condition vs. the preferences). The user may be shown the reason for the interruption and its severity level (e.g., via rendering by the VR visor 410). In situations determined to be "critical," such as the sounding of a smoke alarm, the VR system 402 may be completely disabled (or powered off), thereby ceasing the VR session in its entirety.

In some situations, audio conditions or events detected in the vicinity of the VR session may be incorporated into the VR session or VR environment (e.g., audio captured by the microphone 414 may be rendered in the VR environment via the headphones 412). For example, if the sound of a phone ringing is detected, or the user's name is mentioned in conversation, in the vicinity of the VR session, the sound (having been recorded by the microphone 414) may be rendered in the VR environment so that the user can hear it. In some embodiments, when the reason for the interruption ends (e.g., the phone stops ringing or the conversation changes topic) the audio incorporation may be ceased (or turned off).

In some situations, visual conditions or events detected in the vicinity of the VR session may be incorporated into the VR session of VR environment (e.g., video captured by the camera 416 may be rendered in the VR environment via the VR visor 410). In some embodiments, a portion of the display device in the VR visor 410 is utilized to render or display the condition or event (e.g., in a "pop-up window"). The rendering of the condition may show the entirety of the streaming video (e.g., show everything that is going on in the room) or incorporate only the person or object that is the cause for the interruption (e.g., show only the user's child but not the furniture he/she next to them). In some embodiments, when the reason for the interruption ends (e.g., the child leaves the room) the video incorporation may be ceased (or turned off).

In some embodiments, after an interruption has been issued, the user may provide feedback (e.g., via electronic communications, such as email, or manual entry into a computing node) as to their satisfaction with the interruption (e.g., was it correct to interrupt the VR session for the detected situation?). This feedback may be provided in the form of a rating. The cognitive system 404 (and/or the system 400 as a whole and/or a centralized system) may use the feedback for self-learning purposes to improve user specific preference adoption and severity ratings in future VR sessions.

Figure 5:
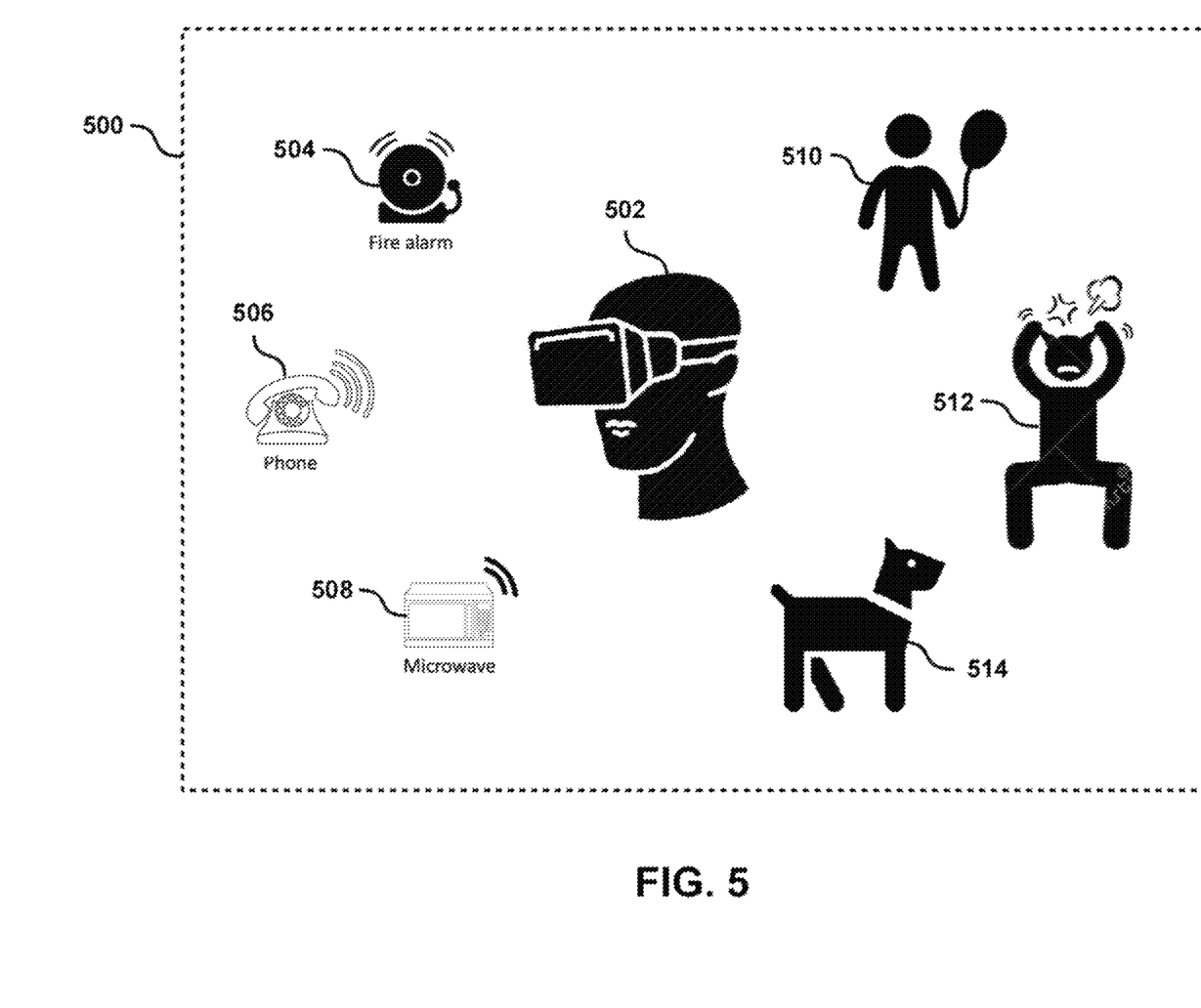
FIG. 5 is a simplified plan view of a vicinity in which a user is experiencing a VR session according to an embodiment of the present invention.

FIG. 5 is a simplified plan view of a vicinity (or area) 500 which is being utilized by a user 502 for a VR session. Although the vicinity 500 is shown as a rectangle, it should be noted that the vicinity 500 may have any shape and may be of any suitable size (e.g., the room in which the VR session is taking place, the building in which a VR session is taking place, the area around the building, an outdoor space, etc.). Further, it should be noted that some of the conditions or events that may result in the interruption of a VR session may not be localized to the area immediately around the user 502. For example, a news alert related to an emergency situation, such as a hurricane or forest fire, which may be occurring miles away from the user 502, may be utilized to cause the interruptions of VR sessions as described herein.

However, for simplicity, FIG. 5 shows several examples of conditions or events in the vicinity 500 that may be used to interrupt a VR session. In particular, a fire alarm 504 being triggered, a phone 506 ringing, and/or a microwave 508 finishing a cycle may be used to interrupt VR sessions to varying degrees, as described above (e.g., based on the preferences 406). Further, the presence of a child 510, an adult 512 (e.g., perhaps depending on their actions/emotional state as determined by the cognitive system 404), and/or a pet 514 in the vicinity 500 (e.g., with the same room as the user 502) may (also) be used to interrupt VR sessions to varying degrees, as described above.

It should be noted that some conditions may be detected in multiple ways. For example, the presence of another person in the vicinity 500 may be detected using a camera (e.g., camera 416 in FIG. 4) or the detected presence of an electronic device (e.g., a mobile phone). In situations in which an "unknown" electronic device (e.g., a mobile phone not registered to a contact or friend of the user) is detected, because of the unknown nature of that device, the severity of the condition may be considered to be greater.

Figure 6:
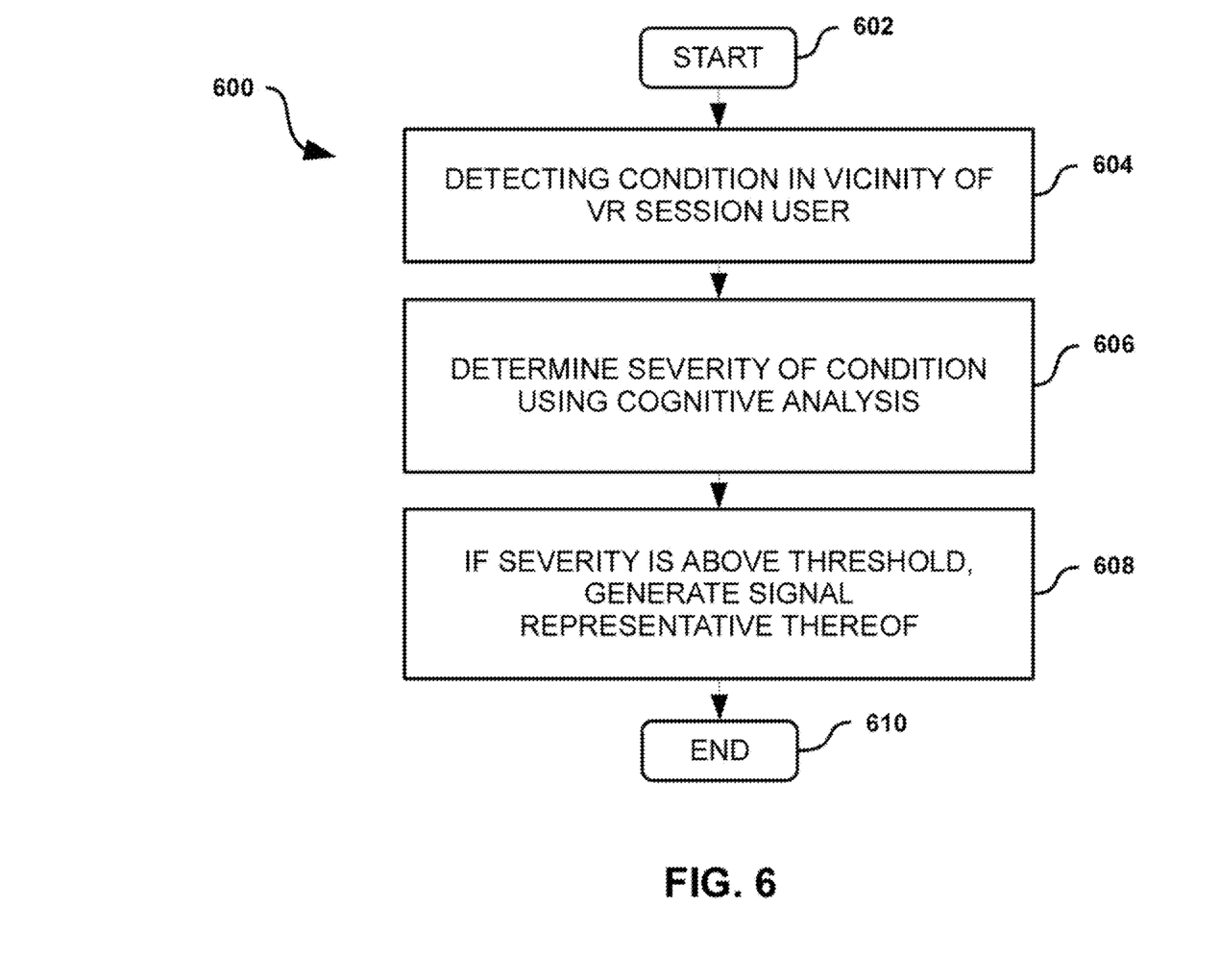
FIG. 6 is a flowchart diagram of an exemplary method for managing VR sessions according to an embodiment of the present invention.

Turning to FIG. 6, a flowchart diagram of an exemplary method 600 for managing VR sessions is illustrated. Method 600 begins (step 602) with, for example, a user initiating a VR session or already being immersed in or experiencing a VR session. As described above, the VR session may be implemented using a VR system that includes (or has integrated therein) a VR visor, headphones, a microphone, and a camera.

A condition in a vicinity of a user experiencing a VR session is detected (step 604). The detecting of the condition may include detecting an object in the vicinity with the camera 416 integrated with the VR system, detecting a sound in the vicinity with a microphone 414 integrated with the VR system, and/or may be performed utilizing an electronic device external to the VR system (e.g., an IoT device 408).

A severity of the condition is determined (step 606). In some embodiments, the determining of the severity of the condition is performed using a cognitive analysis. The determining of the severity of the condition may include identifying the condition based on the detecting of the condition (e.g., the images or sounds captured). The identifying of the condition may be performed utilizing at least one of a visual recognition service 418 and an audio recognition service 420.

If the severity is above a predetermined threshold, a signal representative thereof is generated (step 608). The signal may be used to cause the VR session to be interrupted. The causing of the interrupting of the VR session may include ceasing the VR session, incorporating a visual rendering of an object into the VR session, and/or incorporating an audible rendering of a sound into the VR session.

Method 600 ends (step 610) with, for example, the interruption of the VR session ending (e.g., the VR session returning to normal operation) if/when the condition that caused the interruption subsides. After the VR session, the user may provide feedback (e.g., through surveys or questionnaires provided to the user) which may then be utilized to improve the performance of system with respect to interruptions during future VR sessions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing virtual reality (VR) sessions comprising:
   detecting a condition associated with a user experiencing a VR session, wherein detecting the condition includes determining that an identified entity has entered within a predefined vicinity of the user;
   determining a severity of the condition by performing a cognitive analysis of the condition that will affect the user, wherein performing the cognitive analysis includes identifying whether any alternative entities are accompanying the entity within the predefined vicinity of the user, and cognitively analyzing natural language, inclusive of a tone and sentiment, spoken between the identified entity and the any alternative entities within the predefined vicinity to determine whether the natural language spoken relates the user; and if the severity is above at least one predetermined threshold, generating a signal representative thereof, wherein, when the severity is above a first predetermined threshold as determined by the natural language spoken between the entity and the any alternative entities identified as being related to the user, a recording of those portions of the natural language spoken between the entity and the any alternative entities being related to the user is rendered in a VR system utilized by the user to execute the VR session.

2. The method of claim 1, further including causing the VR session to be interrupted based on the signal.

3. The method of claim 2, wherein the causing of the VR session to be interrupted includes ceasing the VR session.

4. The method of claim 2, wherein the detecting of the condition is performed utilizing an electronic device external to the VR system.

5. The method of claim 1, wherein the determining of the severity of the condition includes identifying the condition based on the detecting of the condition, wherein the identifying of the condition is performed utilizing at least one of a visual recognition service and an audio recognition service.

6. A system for managing virtual reality (VR) sessions comprising:
at least one processor that
detects a condition associated with a user experiencing a VR session, wherein detecting the condition includes determining that an identified entity has entered within a predefined vicinity of the user;
determines a severity of the condition by performing a cognitive analysis of the condition that will affect the user, wherein performing the cognitive analysis includes identifying whether any alternative entities are accompanying the entity within the predefined vicinity of the user, and cognitively analyzing natural language, inclusive of a tone and sentiment spoken between the identified entity and the any alternative entities within the predefined vicinity to determine whether the natural language spoken relates the user; and
if the severity is above at least one predetermined threshold, generates a signal representative thereof, wherein, when the severity is above a first predetermined threshold as determined by the natural language spoken between the entity and the any alternative entities identified as being related to the user, a recording of those portions of the natural language spoken between the entity and the any alternative entities being related to the user is rendered in a VR system utilized by the user to execute the VR session.

7. The system of claim 6, wherein the at least one processor further causes the VR session to be interrupted based on the signal.

8. The system of claim 7, wherein the causing of the VR session to be interrupted includes ceasing the VR session.

9. The system of claim 7, wherein the detecting of the condition is performed utilizing an electronic device external to the VR system.

10. The system of claim 6, wherein the determining of the severity of the condition includes identifying the condition based on the detecting of the condition, wherein the identifying of the condition is performed utilizing at least one of a visual recognition service and an audio recognition service.

11. A computer program product for managing virtual reality (VR) sessions by one or more processors, the computer program product comprising a non-transitory computer-readable storage medium having computer-readable program code portions stored therein, the computer-readable program code portions comprising:
an executable portion that detects a condition associated with a user experiencing a VR session, wherein detecting the condition includes determining that an identified entity has entered within a predefined vicinity of the user;

an executable portion that determines a severity of the condition by performing a cognitive analysis of the condition that will affect the user, wherein performing the cognitive analysis includes identifying whether any alternative entities are accompanying the entity within the predefined vicinity of the user, and cognitively analyzing natural language, inclusive of a tone and sentiment spoken between the identified entity and the any alternative entities within the predefined vicinity to determine whether the natural language spoken relates the user; and an executable portion that, if the severity is above at least one predetermined threshold, generates a signal representative thereof, wherein, when the severity is above a first predetermined threshold as determined by the natural language spoken between the entity and the any alternative entities identified as being related to the user, a recording of those portions of the natural language spoken between the entity and the any alternative entities being related to the user is rendered in a VR system utilized by the user to execute the VR session.

12. The computer program product of claim 11, wherein the computer-readable program code portions further include an executable portion that causes the VR session to be interrupted based on the signal.

13. The computer program product of claim 12, wherein the causing of the VR session to be interrupted includes ceasing the VR session.

14. The computer program product of claim 12, wherein the detecting of the condition is performed utilizing an electronic device external to the VR system.

15. The computer program product of claim 11, wherein the determining of the severity of the condition includes identifying the condition based on the detecting of the condition, wherein the identifying of the condition is performed utilizing at least one of a visual recognition service and an audio recognition service.

* * * * *